United States Patent [19]
Mossberg et al.

[11] Patent Number: 6,160,656
[45] Date of Patent: Dec. 12, 2000

[54] METHOD AND APPARATUS FOR OPTICAL CORRELATION RECOGNITION BY TIME-INTEGRATED NONLINEAR DETECTION

[75] Inventors: Thomas Mossberg; Michael Munroe; Anders Grunnet-Jepsen; John Sweetser, all of Eugene, Oreg.

[73] Assignee: Templex Technology, Inc., San Jose, Calif.

[21] Appl. No.: 09/132,006

[22] Filed: Aug. 10, 1998

Related U.S. Application Data

[60] Provisional application No. 60/090,202, Jun. 22, 1998, provisional application No. 60/090,088, Jun. 20, 1998, provisional application No. 60/070,684, Jan. 7, 1998, and provisional application No. 60/082,989, Apr. 24, 1998.

[51] Int. Cl.$^7$ .................................................. G06K 9/64
[52] U.S. Cl. ........................ 359/328; 359/326; 359/561; 382/278
[58] Field of Search ................................ 359/326–332, 359/558–561; 382/209–211, 278–281

[56] References Cited

U.S. PATENT DOCUMENTS

| | | | |
|---|---|---|---|
| 4,792,230 | 12/1988 | Naganuma et al. | 356/345 |
| 5,367,579 | 11/1994 | Javidi et al. | 382/210 |
| 5,675,436 | 10/1997 | Damen et al. | 359/561 |
| 5,699,449 | 12/1997 | Javidi | 359/561 X |

OTHER PUBLICATIONS

Reid et al., "Commercial Semiconductor Devices for Two Photon Absorption Autocorrelation of Ultrashort Light Pulses," Optics and Phontonics News, vol. 9, No. 5, 1998, 3 pages.

*Primary Examiner*—John D. Lee
*Attorney, Agent, or Firm*—Klarquist Sparkman Campbell Leigh & Whinston, LLP

[57] ABSTRACT

Methods and apparatus are provided for the recognition of an optical signal that is encoded with a specified temporal pattern. Nonlinear optical interactions and time-integrating optical detectors are used to identify temporally short correlation peaks in an optical signal in an optical communication system without temporally resolving the correlation signal. The apparatus includes means for decoding an encoded optical waveform, a time-integrating nonlinear detection system, a time-integrating linear detection system for proper normalization, and thresholding electronics that produce voltage pulses corresponding to the presence of specified waveforms at the detector input.

21 Claims, 3 Drawing Sheets

METHOD AND APPARATUS FOR OPTICAL CORRELATION RECOGNITION BY TIME-INTEGRATED NONLINEAR DETECTION

RELATED APPLICATIONS

This application claims the benefit of U.S. Provisional Application Nos. 60/090,202, filed Jun. 22, 1998, 60/090,088, filed Jun. 20, 1998, 60/070,684, filed Jan. 7, 1998, and 60/082,989, filed Apr. 24, 1998.

FIELD OF THE INVENTION

The present invention relates to optical communication systems and more particularly to the use of time-integrated nonlinear detection as a means for recognizing the presence of optical waveforms with specific temporal patterns.

BACKGROUND AND SUMMARY OF THE INVENTION

In many applications involving optical signals, it is important to be able to discriminate between signals with different temporal structure even though they may contain similar amounts of energy. In particular, some optical communication systems, such as optical code-division multiple-access (OCDMA), rely on this ability. In OCDMA systems, such as described in co-pending U.S. patent application Nos. 09/100,592, filed Jun. 19, 1998, and 09/115,331, filed Jul. 14, 1998, multiple optical channels are multiplexed by impressing a specific temporal code onto the bits comprising a specific channel and then combining the multiple channels in a common transport mechanism wherein the multiple channels remain distinguishable at least on the basis of the impressed time code. Demultiplexing can be accomplished using filtering devices providing multiple output channels, each of which comprises an optical signal representative of that portion of the multiplexed data having a specific time code. The filtering devices may operate by various mechanisms. An exemplary mechanism uses the cross-correlation of the multiplexed data stream with a reference temporal waveform. Typically, but not necessarily, the reference waveform is one of those waveforms utilized in the OCDMA channel-encoding scheme. The temporal waveform of signals produced by the demultiplexer in a specific output channel subsequent to the arrival of a particular time code on the multiplexed transmission channel depends on the degree of similarity between the input time code and the output channel reference time code.

Specifically, close matches of input and reference time codes typically produce output signals including a temporally brief, high power subsignal. Occurrence of a brief, high power subsignal is then indicative of a close match. The overall energy of output signals displays sensitivity to a degree of match between the input and a reference time code, but the sensitivity may be weak. The degree of match between input and reference time codes can be ascertained by time-resolved detection of the output signal since such detection reveals the presence or absence of brief, high power subsignals. Apparatus for direct time-resolved detection are known in the art, but they require the use of expensive, high-speed detection equipment. The present invention provides a means of processing output channel signals so as to provide a robust means of differentiating between output signals of similar energy but different temporal waveform without the need of time-resolving the temporal waveform of the output signals.

In order to identify those optical signals in a specific output channel that contain high-power subsignals and to discriminate them from output signals containing similar energy but no high-power subsignal, nonlinear optical processes can be used according to the present invention. By high-power subsignal, we mean a temporally short pulse of optical energy. Such high-power subsignals are indicative in OCDMA applications of a close match between the time code of an input bit and the output channel's reference time code. The time-integrated output from a detection system incorporating at least one nonlinear element in conjunction with proper threshold detection can distinguish optical signals containing short, high power subsignals from those that do not, even though the detection lacks the ability to temporally resolve the high power subsignal.

The present invention relates specifically to the use of time-integrated nonlinear detection for the purpose of signaling the presence of high power subsignals. In general, any response that depends nonlinearly on the input optical intensity will serve the intended purpose.

A first common form of optical nonlinearity is second-harmonic generation (SHG). This type of interaction has been used for many years as a way of measuring the temporal waveform of short pulses of light as described by Naganuma et al., U.S. Pat. No. 4,792,230. The present invention does not relate to the measurement of temporal waveforms. The present invention relates to the determination of the presence of a high power subsignal within an optical signal without the need to temporally resolve the optical signal.

A second form of second-order effect that can be used for the purpose of the present invention is two-photon absorption (TPA). Specifically, two-photon-induced photocurrent in semiconductor devices is especially useful since the nonlinear material and the photodetector are integrated into the same physical device. In addition, unlike SHG, TPA is largely polarization-independent and does not require phase matching and is therefore simpler to implement. The main constraint on TPA optical detection is that the semiconductor bandgap must be larger than the photon energy (to minimize linear absorption) and smaller than twice the photon energy. Conventional semiconductor waveguides, photodiodes, LEDs, and laser diodes have all been demonstrated to produce TPA photocurrents (see, for example, Reid et al., "Commercial Semiconductor Devices for Two Photon Absorption Autocorrelation of Ultrashort Light Pulses," Optics and Photonics News, vol. 9, 1998).

In general, the signal $S^{(n)}$ from a time-integrated nonlinear detector has the following form:

$$S^{(n)} = \eta^{(n)} \int dt (I(t))^n \tag{1}$$

where $I(t)$ is the instantaneous intensity versus time of the optical input to the detector, $\eta^{(n)}$ is the nonlinear coefficient, and n is the order of the nonlinear process. For linear detection (n=1), the time-integrated signal is simply proportional to the total energy of the input waveform, i.e., the integrated area of the intensity function properly normalized. For (n>1), the output signal depends on the temporal form of $I(t)$. This can be seen from the following simple examples shown in FIG. 1. A rectangular pulse that has a temporal extent of two units and an intensity of one unit has a time-integrated linear signal strength $S^{(1)}$ of two units. This is identical to the signal $S^{(1)}$ of a pulse with a temporal duration of one unit and an intensity of two units. However, the signal $S^{(2)}$ of the same two respective pulses has a ratio of 2:4. Therefore, while the two waveforms shown in FIG. 1 have the same total energy, they can be distinguished based on their time-integrated nonlinear signal strength—the shorter-duration waveform will have a larger time-integrated nonlinear signal.

The present invention comprises an apparatus for the detection of optical signals that uses nonlinear optical interactions and provides for the differentiation between optical signals of similar energy but differing temporal waveform without requiring explicit temporal waveform resolution. The apparatus includes a light diffracting means that is programmed according to a particular temporal function and a first means for causing input optical signals to be incident on the diffracting means. The apparatus also includes a second means for focusing the light emitted by said diffracting means to a particular point in space referred to as the focal point. The light emitted by the diffracting means possesses a temporal waveform representative of the cross-correlation of the input optical signal and the particular temporal function that is programmed into the diffracting means. A nonlinear optical device that produces an electronic signal in response to excitation by light is placed at the focal point of the focusing means. The electronic signal possesses an amplitude that varies nonlinearly in response to the energy content of the input light and varies slowly compared to the instantaneous input optical intensity. Alternatively, a nonlinear optical device that produces an optical signal in response to excitation by light can be placed at the focal point of the focusing means. The optical signal possesses an energy that varies nonlinearly in response to the energy content of the input. The nonlinear optical signal is then converted by a linear optical detector to an electronic signal whose amplitude varies slowly compared to the instantaneous input optical intensity. The present invention also includes an electronic thresholding device that generates an output electronic signal in response to those electronic signals produced by the nonlinear optical device which exceed a preset threshold.

Another aspect of the present invention includes an apparatus for normalizing the electronic signal generated by the nonlinear optical device. The normalizing apparatus includes a linear optical device that produces an electronic signal in response to the light emitted by the diffracting means. The linear optical device is positioned such that it intercepts a portion of the light emitted by the diffracting means. The electronic signal produced by the nonlinear optical device is divided electronically by the electronic signal produced by the linear optical device raised to an algebraic power. The linear optical device has a response that varies slowly in response to the incident optical intensity. The methods provided are especially useful in situations wherein optical signals representative of auto- and cross-correlations are to be distinguished on the basis of the intense, short temporal feature generally found in the auto-correlations but not found in cross-correlations. The correlations of interest can be generated by one of a variety of methods known in the art to produce optical signals representative of correlations between input optical signals or between input optical signals and preprogrammed reference signals. The present apparatus and method utilize detection devices and systems that individually or collectively prohibit the direct observation and manipulation of the temporal profiles of the optical signals to be distinguished.

DETAILED DESCRIPTION

Figure 2A:
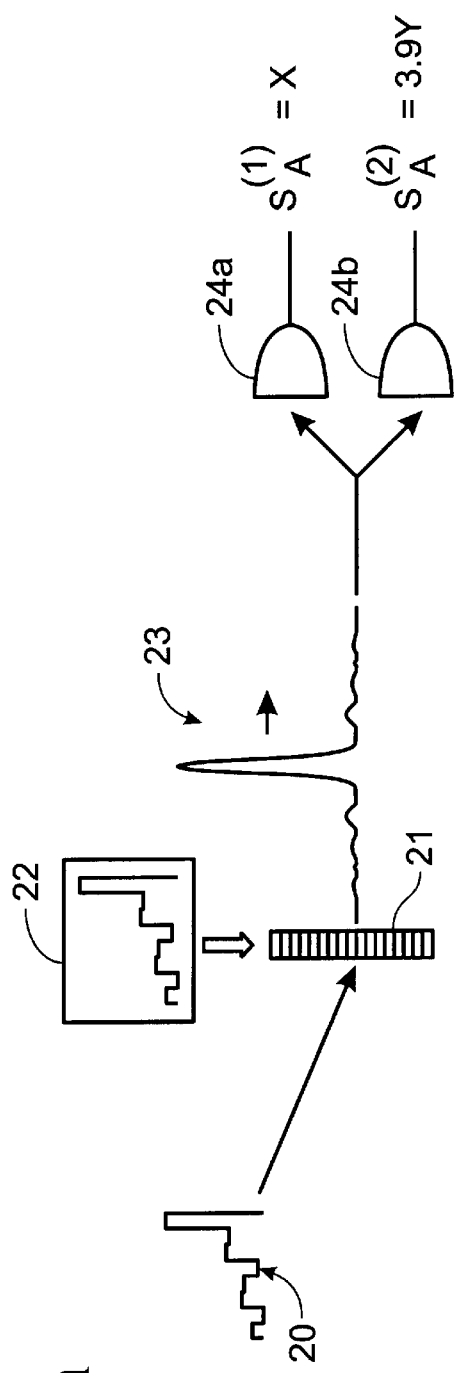
FIGS. 2a–2b are schematic diagrams of an OCDMA system illustrating relative linear and nonlinear signal strengths, respectively.
Figure 2B:
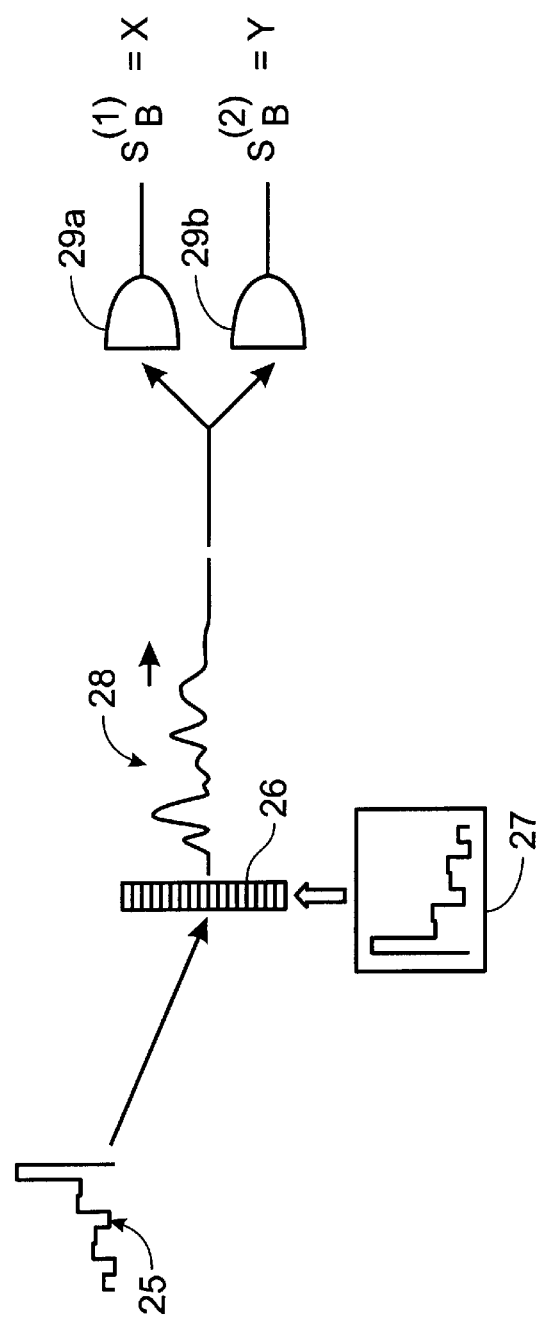

The ability of the present invention to recognize specific temporal waveforms is illustrated schematically in FIGS. 2a–2b. In FIG. 2a, an encoded temporal waveform 20 is incident on a segmented diffraction grating 21 as described in U.S. patent application Ser. No. 09/100,592. The grating 21 is programmed to recognize waveform 22 such that it decodes the encoded waveform 20 by emitting a signal that is in the form of a short auto-correlation pulse 23. The pulse 23 can then be detected by either a time-integrating linear optical detection device 24a or a time-integrating nonlinear optical detection device 24b. In FIG. 2b, an encoded temporal waveform 25 (equal to the waveform 20 of FIG. 2a) is incident on a segmented grating 26 that is described in U.S. patent application Ser. No. 09/100,592, the grating 26 being different from the grating 21 of FIG. 2a. The grating 26 is programmed with a waveform 27 such that it does not match the encoded waveform 25. The signal 28 emitted by the grating 26 is in the form of a cross-correlation that does not have a brief, high power subsignal. The signal 28 is incident on time-integrating linear and nonlinear optical detection devices 29a, 29b, respectively. The high power optical subsignal in the auto-correlation signal 23 gives rise to an enhancement in the signal $S^{(2)}$ over the signal $S^{(2)}$ produced by the cross-correlation signal 28, thereby increasing the detection contrast, in this case by a factor of approximately four. The corresponding signals $S^{(1)}$ for the two outputs of grating 21 and grating 26 are identical and thus not distinguishable. Note that the segmented diffraction gratings 21, 26, can be replaced with segmented fiber Bragg gratings, as described in U.S. patent application Ser. No. 09/120,959, filed Jul. 22, 1998, that are programmed to perform the same functions as the gratings 21, 26. This concept may be implemented using nonlinear processes for n>2. In general, the higher the nonlinear order, the greater the contrast (i.e., the ability to distinguish different waveforms).

The present invention relies on setting a threshold level to discriminate between optical signals of similar energy but with and without high power subsignals. It follows that fluctuations in the input power to the system can lead to detection errors. The present invention thus includes a means for normalizing away input power variations. A normalized signal $S_N^{(n)}$ is derived from the measured nonlinear signal $S^{(n)}$ in the following manner:

$$S_N^{(n)} = \frac{S^{(n)}}{(S^{(1)})^n}. \tag{2}$$

The normalized signal $S_N^{(n)}$ is relatively insensitive to variations in input signal power and enables the use of a constant threshold level to differentiate between optical signals with and without a high power subsignal. For the preferred embodiment described herein of time-integrated second-order detection, the detected signal is thus normalized by the square of the incident pulse energy in order to ensure a constant threshold independent of power fluctuations in the input to the detector. Depending on the specific needs of a system, it may be useful to normalize the nonlinear signal with a different value of n in the denominator of equation (2).

In systems that do not rely solely on the duration of the temporal waveform to determine correlations between input and output channels, such as wavelength-division multiplexing (WDM) or hybrid OCDMA/WDM systems, maximum contrast can be obtained by combinations of $S^{(n)}$ and $S^{(1)}$ other than those described by equations (1) and (2).

Figure 1:
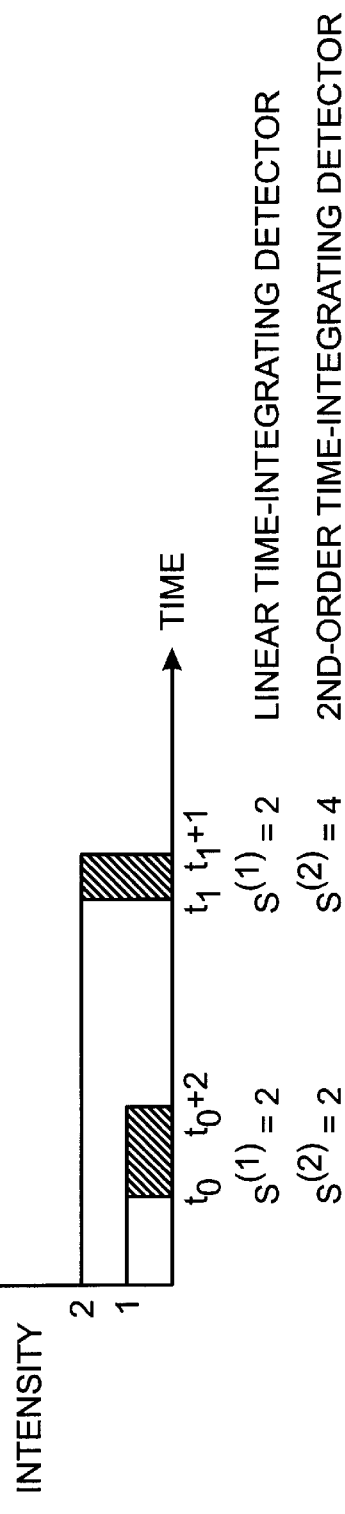
FIG. 1 is a graph of intensity versus time for two optical pulses of different temporal extent but having equal pulse energies.
Figure 3:
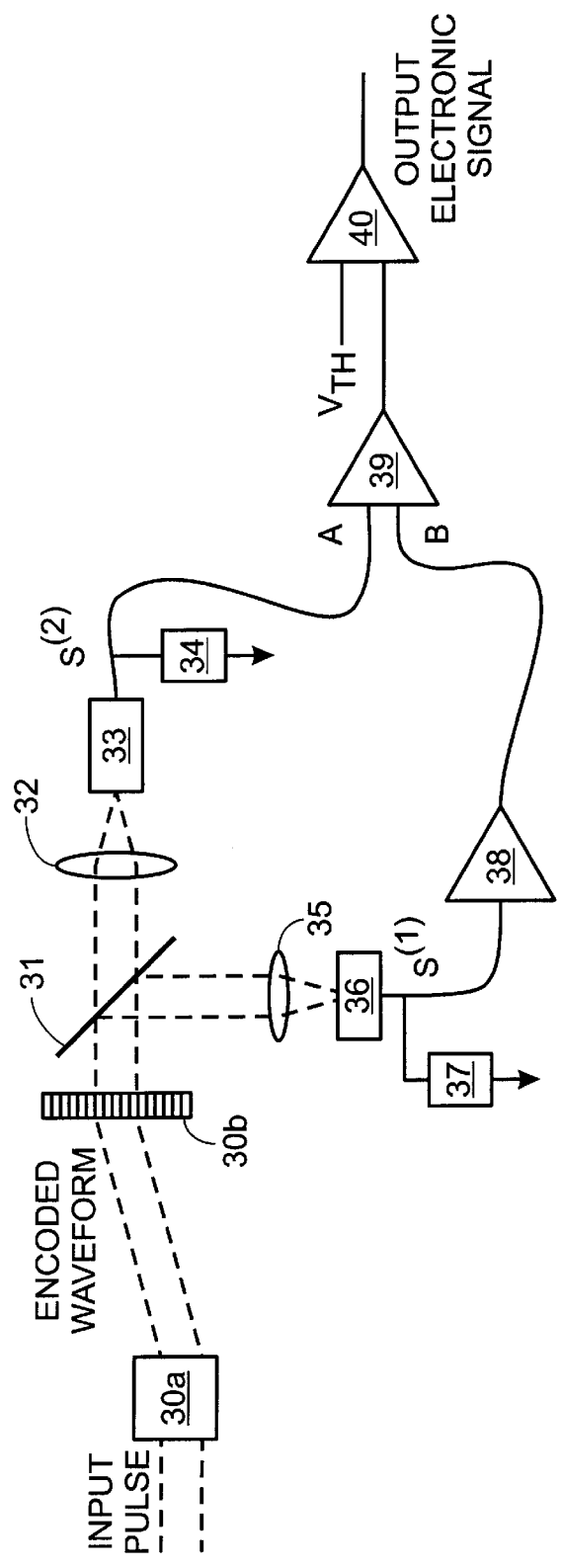
FIG. 3 is a schematic diagram of a system that uses surface diffraction gratings.

A preferred embodiment of a time-integrated nonlinear detection system, including normalization, for the case of TPA photoconductivity is shown in FIG. 3. A train of input pulses at a wavelength of 1.54 μm is encoded by an encoder 30a. The encoded optical waveforms are then incident on a grating 30b. The light emitted by the grating is split by a beamsplitter 31 with the majority of the input energy directed through a lens 32 onto a conventional silicon photodiode 33. Other detection devices known to exhibit TPA could be substituted for 33. In order to increase the intensity incident on the photodiode 33, the optical beam is focused with the lens 32 (or some other focusing element) onto the active area of the TPA device 33 so that a detectable photocurrent is generated. This current is measured as a voltage across a load resistor 34. The required spot size is a function of the incident peak optical energy and the nonlinear response of the detector. In the present embodiment, the incident beam diameter is 1 mm, the optical signal energy is 150 picojoules, the optical waveform duration is 1 picosecond, the focal length of the lens 32 is 40 mm, and the detector 33 is a silicon photodiode. The response time of the detection system must be shorter than the time interval between the arrival of successive temporal waveforms on the nonlinear detector. In the present instance, the detection system time response is less than 50 nanoseconds. The detection system response time need not be shorter than the duration of the individual temporal waveforms, i.e., the detector can integrate over part or all of the temporal waveform of a logically discrete optical signal. The electronic signal from the nonlinear detector is labeled A in FIG. 3. When an appropriate threshold voltage is set, optical signals with high power subsignals will be selected differentially relative to optical signals of similar total energy but without high power subsignals.

In order to normalize the time-integrated nonlinear signal, a small portion of the input energy is reflected by the beamsplitter 31 and is lightly focused by lens 35 onto a photodiode 36 that has a linear response at the wavelength of the incident light. A germanium photodiode can be used for this purpose for a wavelength of 1.54 μm. The focusing lens 35 may be needed only in the case when the cross-sectional area of the input beam is larger than the active area of the linear photodetector. In many situations, the lens 35 can be omitted. The current from the detector 36 is converted to a voltage across load resistor 37. This voltage signal $S^{(1)}$ is then squared (multiplied by itself) electronically by a multiplier 38. The output of the multiplier 38 is labeled B in FIG. 3. The signals A and B are then divided (A/B) electronically by a divider 39 and the output is compared to a threshold voltage by an electronic comparator 40. When the threshold is set to discriminate correctly coded waveforms from incorrectly coded waveforms at the input to the grating 30, the output of the comparator 40 is a series of voltage pulses each of which corresponds to the arrival of an optical waveform that has a code that matches the temporal pattern encoded into the grating. Coded waveforms that do not match the temporal pattern encoded into the grating result in either no voltage pulses from the comparator 40 or voltage pulses that are easily differentiated from those corresponding to the correctly coded input waveforms.

Figure 4:
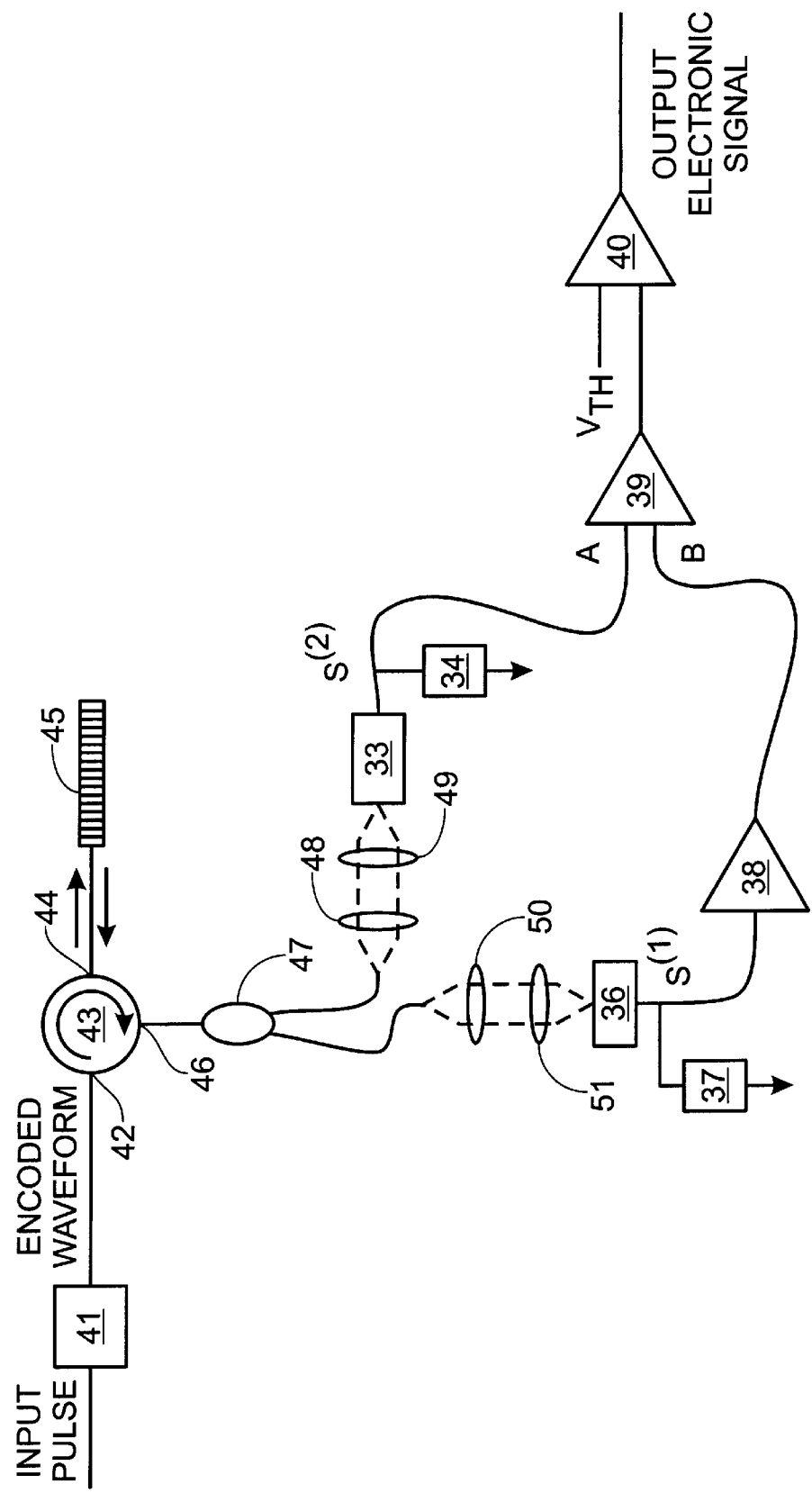
FIG. 4 is a schematic diagram of a system that uses fiber Bragg gratings.

An alternative embodiment of the present invention is shown in FIG. 4. In this embodiment, the segmented surface diffraction grating 30b of FIG. 3 is replaced with a fiber Bragg grating, as described in U.S. patent application Ser. No. 09/120,959, and in U.S. Provisional Patent Application No. 60/090,088, and whose function is the same as grating 30b of FIG. 3. A train of input pulses is encoded by the encoder 41. The encoded waveforms pass along a fiber before entering port 1 (42) of a fiber optic circulator 43. The majority of the light exits port 2 (44) and enters the segmented fiber Bragg grating 45. The light reflected by the fiber grating then passes back into the circulator and exits through port 3 (46) via optical fiber. The purpose of the circulator is to separate spatially the light incident on the fiber grating from that reflected by the fiber grating. This purpose could also be achieved using a fiber coupler instead of a circulator. The reflected light represents the temporal cross-correlation between the incident optical waveform and the waveform encoded into the fiber grating. The output of port 3 is then split into two beams by a fiber splitter 47 such that the majority of the light is sent first to a collimating lens 48 and then a focusing lens 49. The nonlinear detection device 33 is placed at the focus of the focusing lens 49. The other output of the splitter is sent first to a collimating lens 50 and then a focusing lens 51. The linear detection device 36 is placed at or near the focus of the focusing lens, 51. The operation of the remainder of the system is identical to that for segmented surface gratings, as described in FIG. 3. In another embodiment, lenses 48, 49, 50, 51 are removed and the fiber outputs of the fiber splitter 47 are directly coupled to the detectors 33, 36.

It is important to note that the time integrated-nonlinear detector used in the aforementioned embodiments is comprised of a nonlinear first device that produces, in response to an input optical signal of specific temporal character, an optical or electrical signal whose aggregate size scales nonlinearly with the energy contained in the input optical signal. If the first device produces an optical output signal, the time-integrated nonlinear detector also needs to comprise a second device that converts optical signals to electrical signals. The second device may be linear or nonlinear provided that any nonlinearity present does not cancel that possessed by the first nonlinear device.

While the invention has been described with respect to the preferred embodiments thereof, it will be understood by those skilled in the art that various changes in format and detail may be made without departing from the spirit and scope of the invention.

We claim:

1. A system for determining if an optical waveform is encoded with a particular temporal pattern, the system comprising:

a light diffracting means that is programmed according to a particular function;

a first means for causing the optical waveform to be incident on the light diffracting means, whereby light emitted by the light diffracting means represents a cross correlation of the temporal pattern and the particular function;

a second means for focusing the light emitted by the light diffracting means to a particular point;

a nonlinear optical device positioned at the particular point, the nonlinear optical device producing an electronic signal possessing an amplitude that varies nonlinearly in response to an energy content of the emitted light and which varies slowly compared to an instantaneous optical power of the emitted light; and an electronic thresholding device operative to generate an output electronic signal in response to electrical signals produced by the nonlinear optical device that exceed a certain preset threshold.

2. The system of claim 1, wherein the nonlinear optical device includes a saturable absorber.

3. The system of claim 2, wherein the saturable absorber is a bulk semiconductor material.

4. The system of claim 2, wherein the saturable absorber is a multiple quantum well semiconductor.

5. The system of claim 1, wherein the light diffracting means is in the form of a segmented surface grating.

6. The system of claim 1, wherein the light diffracting means is in the form of a segmented fiber Bragg grating.

7. The system of claim 1, wherein the optical waveform is encoded with a temporal-spectral code.

8. The system of claim 1, wherein the optical waveform is a time-code-multiplexed data stream.

9. The system of claim 1, wherein the optical waveform is a wavelength-multiplexed data stream.

10. The system of claim 1, wherein the optical waveform is a time-code-multiplexed and wavelength-multiplexed data stream.

11. The system of claim 1, wherein the nonlinear optical device includes a two-photon absorbing optical material.

12. The system of claim 11, wherein the two-photon absorbing material includes a semiconductor photodiode.

13. The system of claim 11, wherein the two-photon absorbing material includes a semiconductor waveguide photodetector.

14. The system of claim 11, wherein the two-photon absorbing material includes a semiconductor light-emitting diode (LED).

15. The system of claim 11, wherein the two-photon absorbing material includes a semiconductor laser diode.

16. The system of claim 1, wherein a first electronic signal produced by the nonlinear optical device in response to a specific input optical signal is normalized through electronic division by a second electronic signal, the second electronic signal corresponding to an output of a linear optical detector responsive to the input optical signal raised to an algebraic power, the linear and nonlinear optical detectors having approximately equal response times.

17. A system for determining if an optical waveform is encoded with a particular temporal pattern, the system comprising:
   a light diffracting means that is programmed according to a particular function;
   a first means for causing the optical waveform to be incident on the diffracting means, whereby light emitted by the diffracting means represents a cross correlation of the temporal pattern and the particular function;
   a second means for focusing the light emitted by the diffracting means to a particular point;
   a nonlinear optical device positioned at the particular point, the nonlinear optical device producing an optical signal possessing an amplitude that varies nonlinearly in response to an energy content of the focused emitted light;
   an optical detector operative to convert the optical signal produced by the nonlinear optical device into a first electronic signal, the first electronic signal varying slowly compared to an instantaneous input optical power; and
   an electronic thresholding device operative to generate a second electronic signal in response to the first electronic signal whenever the first electronic signal exceeds a certain preset threshold.

18. The system of claim 17, wherein the first electronic signal is normalized through electronic division by a third electronic signal, the third electronic signal being representative of an output of a linear optical detector responsive to the input optical signal raised to an algebraic power, the linear and nonlinear optical detectors having approximately equal response times.

19. The system of claim 17, wherein the nonlinear optical device includes a nonlinear optical material and is operative through the effect of second harmonic generation.

20. The system of claim 19, wherein the nonlinear optical material is β-barium borate (BBO).

21. The system of claim 19, wherein the nonlinear optical material is potassium di-hydrogen phosphate (KDP).

* * * * *